United States Patent
Müller et al.

(10) Patent No.: US 6,416,228 B1
(45) Date of Patent: Jul. 9, 2002

(54) ROLLING CONTACT BEARING FOR SUPPORTING HEATED ROLLS

(75) Inventors: Karl Müller, Grettstadt; Gudrun Martin, Euerbach, both of (DE)

(73) Assignee: FAG OEM und Handel AG (DE)

(*) Notice: Subject to any disclaimer, the term of this patent is extended or adjusted under 35 U.S.C. 154(b) by 0 days.

(21) Appl. No.: 09/522,565

(22) Filed: Mar. 10, 2000

(30) Foreign Application Priority Data

Mar. 10, 2000 (DE) .......................................... 199 10 579

(51) Int. Cl.[7] .......................... F16C 33/62; F16C 37/00
(52) U.S. Cl. ...................... 384/492; 384/493; 384/565; 384/557; 384/905
(58) Field of Search ................................ 384/476, 492, 384/569, 905, 900, 493, 557, 546, 538, 907.1; 492/46; 162/375

(56) References Cited

U.S. PATENT DOCUMENTS

| | | | |
|---|---|---|---|
| 2,714,538 A | * | 8/1955 | Hornbostel ................. 384/476 |
| 4,702,526 A | * | 10/1987 | Sankey ................... 384/476 X |
| 4,735,262 A | * | 4/1988 | Lucas ..................... 384/476 X |
| 4,944,611 A | * | 7/1990 | Ankenbauer et al. ... 384/569 X |
| 5,843,282 A | * | 12/1998 | Schmitt et al. ......... 384/905 X |
| 5,971,620 A | * | 10/1999 | Gabelli et al. .............. 384/491 |
| 5,979,305 A | * | 11/1999 | Wadzinski ................ 492/46 X |

FOREIGN PATENT DOCUMENTS

| | | |
|---|---|---|
| DE | 255369 | 3/1988 |
| DE | 4428419 | 2/1996 |
| DE | 19631988 | 2/1998 |
| EP | 0256518 | 2/1988 |
| EP | 1045157 | 10/2000 |
| GB | 2178509 | 2/1987 |

OTHER PUBLICATIONS

Lagen für Papiermaschinen Handbuch, pp. 44, 45, 56 and 57.
Ausreichende Wärmeisolierung und richtige Schmierung erhöhen die Betriebssicherheit und senken die Temperatur, G. Bergling, pp. 2–15.
Lagerung von mit Ol beheizten Kalanderwalzen in Papiermaschinen, G. Bergling, pp. 24–27.
Lagerung von dampfbeheizten Zylindern in Papiermaschinen, G. Bergling, pp. 24–32.

* cited by examiner

*Primary Examiner*—Thomas R. Hannon
(74) *Attorney, Agent, or Firm*—Ostrolenk, Faber, Gerb & Soffen, LLP

(57) ABSTRACT

A rolling-contact bearing for a shaft journal wherein the outside diameter of the shaft journal is thermally insulated relative to the shaft through which a heat transfer medium flows. The bore of the inner race on the shaft journal is provided with a ceramic layer predominantly of zirconium oxide and a smaller among of yttrium oxide to reduce the heat transfer from the shaft journal to the rolling-contact bearing. The inner race also has lateral surfaces toward the elements securing the bearing on the shaft journal. Those lateral surfaces may be provided with a ceramic layer as well.

19 Claims, 2 Drawing Sheets

ROLLING CONTACT BEARING FOR SUPPORTING HEATED ROLLS

BACKGROUND OF THE INVENTION

The invention relates to a rolling-contact bearing for use in a shaft journal of a heated roll or calender.

Rolling-contact bearings in heated rolls or calenders, used, e.g. for the production of paper, plastics, textiles or wood, are subjected to high thermal loads because there is a continuous flow of heat transfer medium, e.g. superheated steam or hot oil for drying the endless webs, flowing through the shaft. Accordingly, the inner race of the rolling-contact bearing is always warmer during shaft operation than the outer race, which is seated in a housing. To reduce the flow of heat from the shaft journal to the inner race, a wide variety of different insulating measures have been tried.

The SKF Kugellager Magazine (number 233, Dd 7391 88-12 Reg. 07771, page 2 ff; number 238, Dd 7531 91-12 Reg. 07771 page 25 ff; number 239 Dd 7617 92-05 Reg. 07771, page 24 ff) and the SKF Handbook 4200T Bearings for Paper Machines, Reg. 861 2 3000 1993-02, page 56 ff describe the problems of this bearing location in great detail. Attention is drawn, in particular, to the need for insulation in the shaft journal. These publications are evidence of years of intense preoccupation with this bearing location. Additional insulation between the rolling-contact bearing and the shaft journal is not described in this context.

In DE 44 28 419 A1, a clamping structure is provided between the shaft journal and the inner race of the rolling-contact bearing to insulate and compensate for the temperature of the bearing. This clamping structure is subjected to axial force by a thrust device. The disadvantage of this solution is that it involves a very high outlay and cannot be retrofitted without reworking the shaft journal.

SUMMARY OF THE INVENTION

It is therefore the object of the invention to provide a rolling-contact bearing for a heated shaft journal, which bearing, on the one hand, has better thermal insulation and, on the other hand, can be installed in the vicinity of the bearing location without additional modifications.

According to the invention, this object is achieved by a rolling-contact bearing with an inner and an outer race and rolling elements between the races. The inner race has an inner bore received on the shaft journal and the inner bore of the inner race is provided with a ceramic layer for reducing the heat transfer from the shaft journal through the ceramic layer to the rolling-contact bearing. In addition, the rolling-contact bearing may be secured on the shaft by securing elements applied at one lateral side of the inner race. The ceramic layer may be provided on the inner race at the lateral side in contact with the securing element, as the securing element is on the shaft journal, as well.

The following advantages are obtained for rolling-contact bearings by coating the inner race with ceramic in accordance with the invention:

The entire rolling-contact bearing is at a lower bearing temperature.

The difference between the operating temperatures of the inner race and of the outer race is reduced. This also reduced the problems associated with the bearing air of the rolling-contact bearing in the various operating states.

There is less mixed friction in the rolling-contact bearing so that the rolling-contact bearing therefore has a longer life.

The life of the lubricating oil used in the bearing increases and the volume flow of lubricating oil through the rolling-contact bearing can be reduced.

Another advantage of these coated rolling-contact bearing is that they can be used without modifications to the surrounding parts. This is particularly important for using these new coated rolling-contact bearings within existing systems without additional expenditure.

The ceramic layer preferably contains at least 90% zirconium oxide $ZrO_2$, while the remainder is predominantly yttrium oxide $Y_2O_3$. An adhesive layer is applied between the inner race and the ceramic layer and it is composed of chromium and nickel. One example of the composition of the coating is a $\frac{1}{10}$-mm adhesive layer and a $\frac{9}{10}$-mm ceramic layer.

The thickness of the coating must be taken into account in the dimensioning when producing the inner races to ensure that the rolling-contact bearings have their standardized outside dimensions after coating in order to enable the coated rolling-contact bearings to be used without problems in locations where uncoated rolling-contact bearings had previously been used.

The inside and/or outside diameters or surfaces and end contact surfaces of the withdrawal, clamping and taper sleeves are also provided with the above ceramic layer. For rolling-contact bearings which are mounted on a shaft and which use withdrawal sleeves or clamping sleeves, this significantly enhances the insulating effect because several surfaces between the shaft journal and the inner race of the rolling-contact bearing are coated. This further reduces the flow of heat introduced into the rolling-contact bearing via the inner race.

BRIEF DESCRIPTION OF THE DRAWINGS

The invention is explained in greater detail with reference to the attached drawings.

DETAILED DESCRIPTION OF PREFERRED EMBODIMENTS

Figure 1:
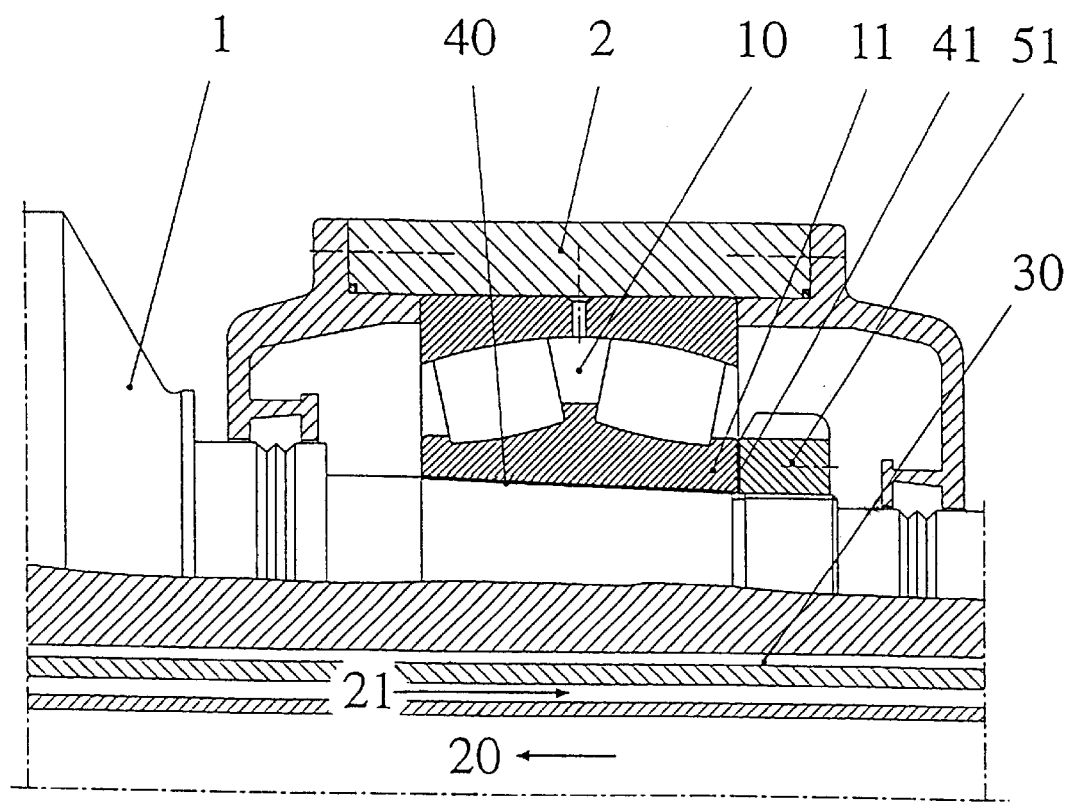
FIG. 1 shows a rolling-contact bearing with a coated tapered bore and a coated lateral surface in a drying cylinder and FIG. 2 shows a rolling-contact bearing which has been assembled with a coated withdrawal sleeve in a drying cylinder.

In FIG. 1, the rolling-contact bearing 10 is installed between a shaft journal 1 and a stationary housing 2. A shaft nut 51 is provided to secure the bearing axially. A first duct 20 for the entry of the heat transfer medium and a return 21 are shown in the shaft journal 1. An insulation zone 30 is arranged as an annular duct outside the return 21.

In the bore, the inner race 11 of the rolling-contact bearing 10 is coated with a ceramic layer 40. Further, on the lateral surface, by which the inner race 11 rests against the shaft nut 51, the inner race is coated with a ceramic layer 41.

Figure 2:
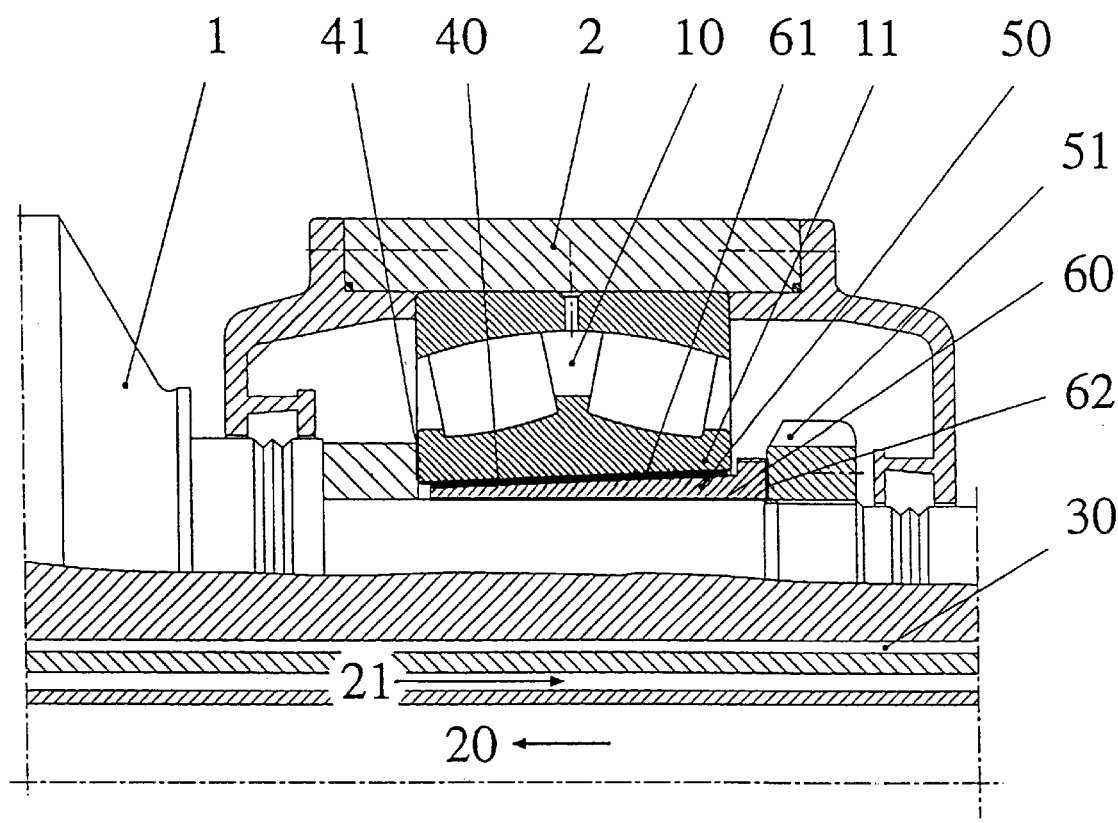

The bearing in FIG. 2 is largely the same as that in FIG. 1. But, in this example, the rolling-contact bearing 11 is secured on the shaft journal 1 by a withdrawal sleeve 50. The withdrawal sleeve 50 is axially secured by the shaft nut 51. The ceramic layers are arranged on the withdrawal sleeve 50, the inner surface 60, the outer surface 61 and the axial contact surface 62 with the shaft nut 51. In this example, the inner race 11 is additionally coated in the bore 40 and on the lateral surface 41.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. A rolling-contact bearing for use on a shaft journal of a heated roll or a calender, wherein the shaft journal is disposed around the shaft;

the bearing comprising an inner race, the inner race having an inner bore surface on the shaft journal and also having a radially outer surface; an outer race having a radially inner surface facing radially inwardly toward the radially outer surface of the inner race; and a set of bearing rolling elements between the outer surface of the inner race and the inner surface of the outer race, establishing rolling-contact therebetween;

the inner bore surface of the inner race at the shaft journal being provided with a ceramic layer for reducing the heat transfer from the shaft journal through the ceramic layer to the rolling contact bearing.

2. The rolling-contact bearing of claim 1, wherein the ceramic layer is disposed on the bore of the inner race.

3. The rolling-contact bearing of claim 2, wherein the inner race has opposite lateral surfaces along the shaft journal;

securing elements holding at least the inner race of the bearing on the shaft journal by the securing elements at one of the lateral surfaces of the inner race; and the ceramic layer being provided at the one lateral surface of the inner race.

4. The rolling-contact bearing of claim 1, wherein the inner race has opposite lateral surfaces along the shaft journal; and securing elements holding at least the inner race of the bearing on the shaft journal by the securing elements at one of the lateral surfaces of the inner race; and the ceramic layer being provided at the one lateral surface of the inner race.

5. The rolling-contact bearing of claim 1, wherein the ceramic layer is comprised of at least 90% zirconium oxide.

6. The rolling-contact bearing of claim 5, further comprising a thin adhesive layer of nickel and chromium between the inner bore surface and the shaft journal.

7. The rolling-contact bearing of claim 6, wherein the remainder of material of the ceramic layer is predominantly yttrium oxide.

8. The rolling-contact bearing of claim 5, wherein the remainder of material of the ceramic layer is predominantly yttrium oxide.

9. The rolling-contact bearing of claim 1, wherein the inner race has standardized outside dimensions of rolling-contact bearing rings.

10. The rolling-contact bearing of claim 1, further comprising a withdrawal sleeve removably securing the rolling-contact bearing on the shaft journal; and securing elements securing the withdrawal sleeve to secure the rolling-contact bearing on the shaft journal, the withdrawal sleeve having inside and outside diameters and at least one of the inside and outside diameters of the withdrawal sleeve being provided with the ceramic layer.

11. The rolling-contact bearing of claim 10, wherein the withdrawal sleeve and the securing elements have lateral end contact surfaces, and the withdrawal sleeve outer diameter is in contact with the inner race of the bearing while the securing elements lateral end surface is in contact with the lateral end surface of the withdrawal sleeve, and the contacting lateral end surfaces are provided with the ceramic layer.

12. The rolling-contact bearing of claim 10, wherein the ceramic layer is comprised of at least 90% zirconium oxide.

13. The rolling-contact bearing of claim 12, further comprising a thin adhesive layer of nickel and chromium between the inner bore surface and the shaft journal.

14. The rolling-contact bearing of claim 13, wherein the remainder of material of the ceramic layer is predominantly yttrium oxide.

15. The rolling-contact bearing of claim 10, wherein the remainder of material of the ceramic layer is predominantly yttrium oxide.

16. The rolling-contact bearing of claim 10, wherein the withdrawal sleeve and the securing elements and the inner race of the contact bearing all have standardized outside dimensions of such elements of rolling-contact bearing accessories.

17. In combination a rolling-contact bearing for a shaft journal of claim 1, a shaft journal received in the bore of the inner race such that the shaft journal and the inner race are in firm engagement and a shaft passing through the shaft journal, the shaft being rotatable along with the journal to rotate the inner race with respect to the outer race of the bearing; the shaft being heated relative to the bearing such that the ceramic layer reduces the heat transfer from the shaft through the shaft journal to the bearing.

18. The combination of claim 17, wherein the shaft journal is thermally insulated relative to the shaft which is heated.

19. The combination of claim 17, further comprising heat transfer medium flow conduits through the shaft for heating the shaft.

* * * * *